United States Patent
Langford

Patent Number: 5,157,372
Date of Patent: Oct. 20, 1992

[54] FLEXIBLE POTENTIOMETER

[76] Inventor: Gordon B. Langford, 11193 S. Star Cir., Sandy, Utah 84092

[21] Appl. No.: 552,575

[22] Filed: Jul. 13, 1990

[51] Int. Cl.$^5$ .............................................. H01C 3/06
[52] U.S. Cl. .................................................. 338/211
[58] Field of Search ............... 338/211, 212, 210, 154, 338/114; 73/781, 849, 862.32, 862.45, 862.47, 517 AV, 655, 767, 781, 862.04, 865.8, 862.46, 862.48

[56] References Cited

U.S. PATENT DOCUMENTS

| | | |
|---|---|---|
| 3,541,491 | 11/1970 | Worster ................................. 338/211 |
| 3,895,288 | 7/1975 | Lampen et al. . |
| 3,968,467 | 7/1976 | Lampen et al. . |
| 4,268,815 | 5/1981 | Eventoff et al. . |
| 4,276,538 | 6/1981 | Eventoff et al. . |
| 4,314,227 | 2/1982 | Eventoff . |
| 4,314,228 | 2/1982 | Eventoff . |
| 4,315,238 | 2/1982 | Eventoff . |
| 4,489,302 | 12/1984 | Eventoff . |
| 4,503,705 | 3/1985 | Polchaninoff ...................... 338/114 |
| 4,605,593 | 8/1986 | Iida . |
| 4,649,784 | 3/1987 | Fulks et al. . |
| 4,763,534 | 8/1988 | Hager . |
| 4,837,548 | 6/1989 | Lodini ................................... 338/47 |
| 4,876,419 | 10/1989 | Lodini ............................. 338/114 X |

*Primary Examiner*—Marvin M. Lateef
*Attorney, Agent, or Firm*—Trask, Britt & Rossa

[57] ABSTRACT

A deflectable substrate such as a phenolic resin has a conductive ink deposited thereon in a pattern preferably with a segmented conductor position on top to form a flexible potentiometer in which the resistance consistently and predictably changes upon deflection or the bending of the substrate.

17 Claims, 2 Drawing Sheets

FLEXIBLE POTENTIOMETER

BACKGROUND OF THE INVENTION

1. Field

This invention relates to electrical components and more particularly to potentiometers which vary in electrical resistance.

2. State of the Art

Potentiometers are standard elements of electrical and electronic circuits. They are widely in use today for a variety of purposes including the measurement of mechanical movement. Even though a wide variety of potentiometers are presently available, no potentiometer known to applicant produces a consistently and predictably variable electrical output upon deflection or bending between various configurations.

The use of electrically conductive inks in association with electrical or electronic circuitry is also known. For example, U.S. Pat. No. 4,649,784 (Fulks, et al.) discloses the use of a conductive ink which is pressure sensitive to produce electrical switching signals for a keyboard. However, no flexible or deflectable potentiometer is known which uses electrically conductive ink.

SUMMARY OF THE INVENTION

A flexible potentiometer comprises a substrate, conductor means and connector means. The substrate is formed of a deflectable and electrically insulating material. The conductor means is adhered to the substrate in a preselected pattern. The conductor means is formed of an electrically conductive ink which predictably changes electrical resistance upon deflection of the substrate between a first configuration and a second configuration. The connector means is associated with the conductor means for interconnection to external electrical components.

The flexible potentiometer desirably includes a segmented conductor adhered to the conductor means. The segmented conductor is formed of an electrically conductive material in segments each spaced from the other along the conductor means. In one embodiment, the substrate is elastically deflectable.

The electrically conductive ink is preferably of the type which is applied to the substrate in liquid form and which in turn dries to a solid form. The segmented conductor is of the type which is applied to the conductor means in liquid form and which also dries to a solid form. Alternatively, the segmented conductor may be a solid which is pressed onto the conductor means.

In one configuration, the substrate of the flexible potentiometer has a length with a longitudinal axis. The conductor means is a circuit having first leg and a second leg each extending along the length of the substrate. A third leg interconnects the first leg with the second leg. The first and second legs are substantially parallel to the longitudinal axis.

The segmented conductor preferably has a plurality of segments each having a width substantially the width of the conductor means and a length selected to regulate the electrical resistance of the conductor means. The segmented conductor is preferably made of a soft conductive metal such as silver or a silver alloy. It may also be made of carbon or a carbon compound. Each segment is from about 2 millimeters to about 10 millimeters in length.

BRIEF DESCRIPTION OF THE DRAWINGS

In the drawings, which illustrate what is presently regarded as the preferred embodiment for carrying out the invention.

DETAILED DESCRIPTION OF THE ILLUSTRATED EMBODIMENT

Figure 1:
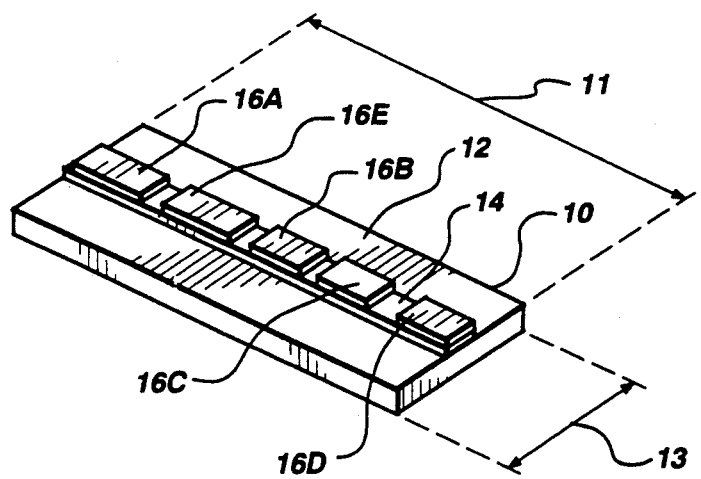
FIG. 1 is an enlarged perspective view of a portion of a flexible potentiometer of the instant invention.

FIG. 1 illustrates a portion of a flexible potentiometer of the instant invention in perspective and substantially enlarged. The flexible potentiometer includes a substrate 10 which is formed of a deflectable electrical insulating material. Various types of phenolic resin materials are presently believed to be suitable as the substrate. For example, a phenolic resin Formula 3609 manufactured by Electronic Materials Corporation of America, 160 Commerce Drive, Montgomery, Pa., has been found suitable in that it is elastically flexible or bendable for many thousands of cycles or bends. At the same time it is a suitable electrical insulator.

For applications involving multiple bending movements, the phenolic resin has been found to be particularly suitable. However, other materials may be suitable in selected applications. For example, the potentiometer may be used to measure inelastic deformation so that the substrate itself is inelastically deformable. The critical issue is that the substrate be deflectable without causing an electrical discontinuity or open circuit in the conductor means while generally maintaining its electrical insulating characteristics.

Figure 3:
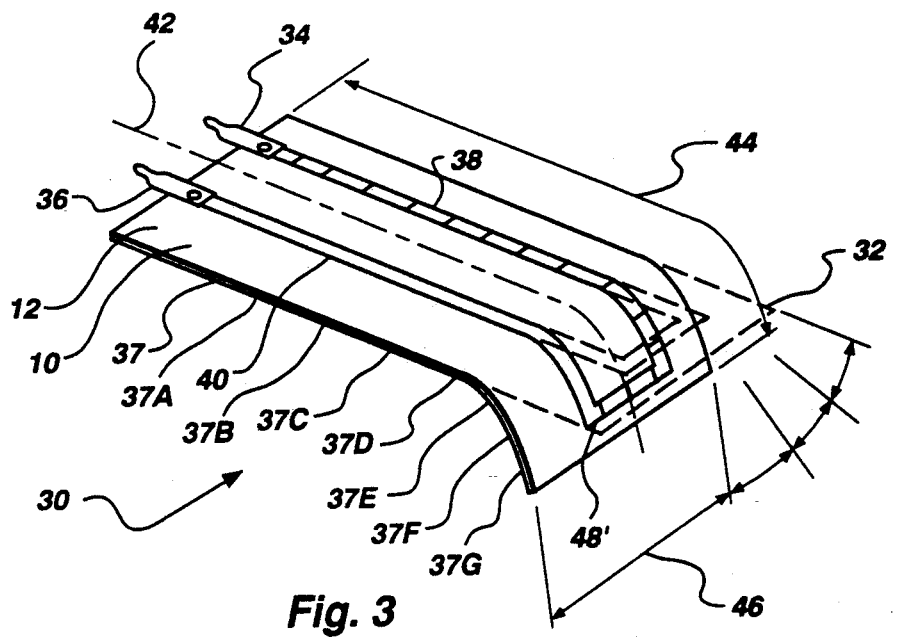
FIG. 3 is a perspective of a representative potentiometer of the instant invention.

The substrate 10 illustrated in FIG. 1 has a top surface 12 to which the conductor means 14 is here applied in a preselected pattern. For example, in FIG. 3 the pattern is "U" shaped to present a particular desired circuit. Other shapes may be desired to produce a variety of different electrical outputs upon deflection. At present, the preselected pattern preferred is straight or linear as illustrated in FIGS. 1 and 3, for reasons discussed hereinafter.

The conductor means 14 of FIG. 1 is formed of an electrically conductive ink which predictably changes electrical resistance upon deflection or bending of the substrate 10 between a first configuration and a second configuration. The conductor means may also be a two-part epoxy material, a thermoset adhesive, or a thermoplastic, all incorporating conductive material such as graphite. The flexible potentiometer also includes connector means associated with the conductor means for interconnection to external electrical components as described with respect to FIG. 3.

The flexible potentiometer of FIG. 1 also includes a segmented conductor 16 adhered to the conductor means 14. The segmented conductor is formed of an electrically conductive material in segments 16A, 16B, 16C, 16D and 16E, each spaced from the other along the conductor means 14.

As noted hereinbefore, FIG. 1 depicts only a portion of a flexible potentiometer. That is, the length 11 may be longer (or shorter) than shown. The width 13 is greater so that the conductor means may be formed into a complete circuit such as the one shown in FIG. 3.

Figure 2:
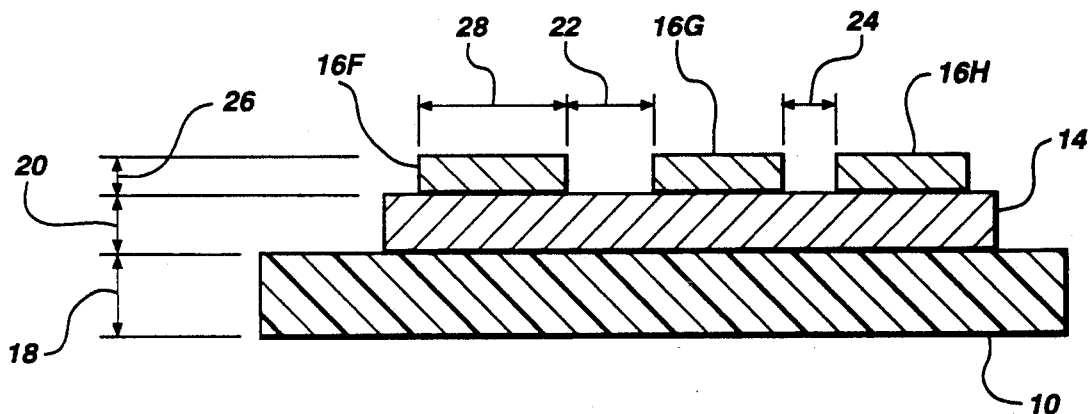
FIG. 2 is substantially enlarged cross-section of a portion of a flexible potentiometer of the instant invention.

Referring to FIG. 2, the substrate 10 is shown to have a thickness 18 which is here shown substantially disproportionate to the true thickness of the substrate solely to facilitate illustration. That is, for the substrate 10 to be elastically deflectable, it is preferred that its thickness be from about ½ to about 1½ millimeters. If it is to be inelastically deflectable, the material and thickness must be appropriately selected.

The conductor means 14 of FIG. 2 is a conductive ink which is adhered to the substrate 10. By adhere, it is meant that the conductive ink is attached to the substrate because the conductive ink includes a material which facilitates wetting, gluing, or sticking. A conductive ink suitable for the illustrated embodiment is available from Vintage Capital Corporation, 140 South Chapparal Court, Suite 110, Anaheim, Calif. 92808, and is identified as Formula or Model GL 71448. The selected ink includes graphite in combination with a binder.

As illustrated in FIG. 2, the conductive ink 14 is deposited to adhere to the substrate 10 and in turn has a thickness 20 which is here illustrated substantially larger than the actual thickness. That is, the thickness 20 is illustrated disproportionate to the actual thickness of the substrate and of the actual layer of the conductive ink 14. In particular the thickness 20 of the conductive ink 14 is from about 0.01 millimeters to 1 millimeter and desirably about 0.05 millimeters.

As illustrated in FIG. 2, a segmented conductor 16 may be positioned and adhered to the conductor means 14. The segmented conductor 16 is comprised of a plurality of segments 16A-E as illustrated in FIG. 1. The segments are each spaced apart a preselected distance 22 and 24 as shown in FIG. 2. Notably, the distances 22 and 24 may be different; or they may be selected to be substantially the same, as desired by the user. The segments are positioned on the conductive ink 14 to regulate the conductivity and in turn the electrical resistance of the conductive ink 14 as more specifically discussed hereinafter.

It may also be noted that the segmented conductor is adhered to the conductive ink and in turn has a thickness 26 which is from about 0.2 millimeters to about 1 millimeter and preferably about 0.5 millimeters. Each segment 16F and 16G has a length 28 selected to regulate the electrical resistivity of potentiometer discussed hereinafter.

Referring now to FIG. 3, the substrate 10 is shown with conductor means 14 positioned thereon. That is, conductor means with the segmented conductor 16 is positioned on the substrate 10 which is deflectable between a first configuration illustrated with solid lines 30 and a second configuration illustrated with dotted lines 32. Simply stated, the substrate 10 is bendable or deflectable between the configuration 30 and the configuration 32. Upon deflection between the position or the configuration 30 and the configuration 32, the electrical resistance as measured between connectors 34 and 36 varies consistently and predictably. That is, the variance in electrical resistance is not only predictable or known for the various deflections or configurations, but also the variance is consistent and does not radically or randomly change over the lifetime of the potentiometer. Thus, the substrate 10 can be repetitively deflected between the configuration 30 and the configuration 32, and the resistance will thereby consistently and predictably vary to reflect the deflection and the configuration.

Empirically, it has been ascertained that the deflection between the positions 32 and 30 and all configurations therebetween can be determined so that the precise position of the substrate as it is deflected between positions 32 and configuration 30 can be readily ascertained by measurement of the electrical resistance at the connectors 34, 36 and thereafter by appropriate computations, which can be effected using appropriate computer software as now available from Abrams & Gentile Entertainment, Inc., 244 West 54th Street, New York, N.Y. 10019. That is, a microprocessor can be connected to the conductors 34 and 36. The microprocessor has software to in turn calculate the deflection of the flexible potentiometer between any two selected configurations. That is, the microprocessor is able to compute the relative positions of certain points 37A-G along the edge 37 of the substrate based on the resistance detected at conductors 34 and 36 and thereafter transmit or display that information as desired. Thus, the position or configuration of the substrate 10 and the flexible potentiometer is reflected by the resistance.

Figure 4:
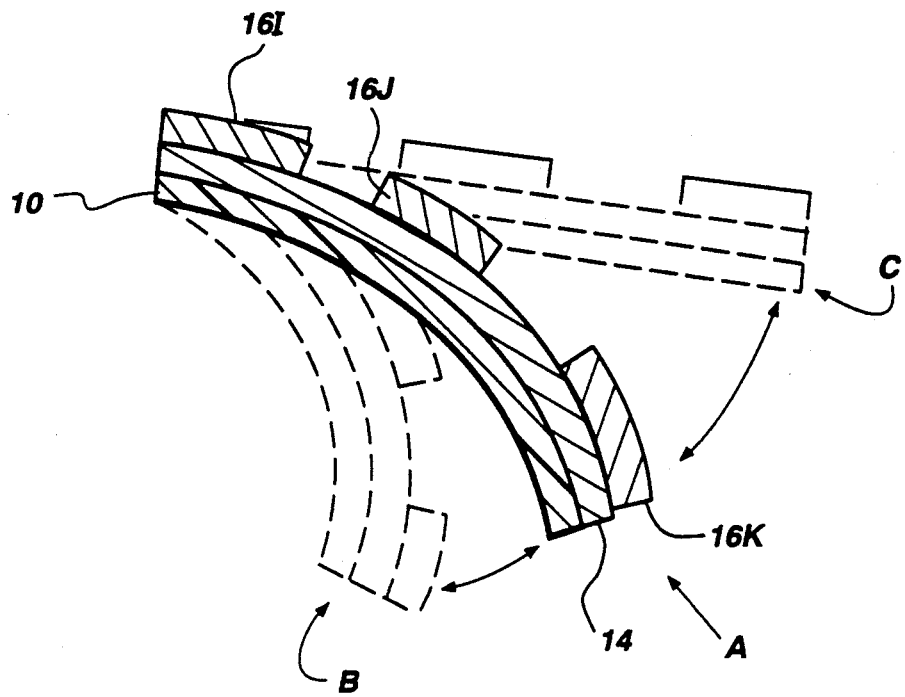
FIG. 4 is an enlarged cross-section of a portion of a flexible potentiometer of the instant invention showing two other configurations in phantom.

In FIG. 4, a portion of the flexible potentiometer is shown in a bent configuration A and in a further bent configuration B shown in doted line. It is also shown in a non-deflected configuration C. The electrical resistance of the potentiometer consistently, predictably varies as the potentiometer is bent or deflected incrementally to any configuration between configuration A, B and C as well as other configurations involving greater bending or deflection.

Figure 5:
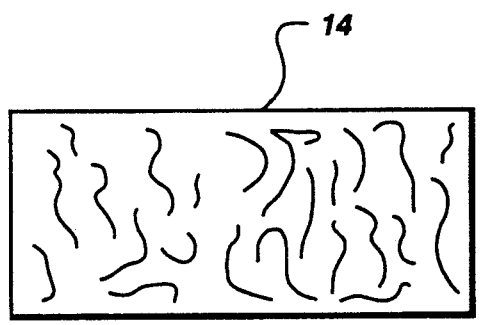
FIG. 5 is a depiction of an envisioned microscopic enlargement of a portion of a flexible potentiometer of the instant invention.

As the flexible potentiometer is deflected or bent, it is believed but has not yet been scientifically confirmed that the conductive ink which contains graphite, cracks or deforms as depicted in FIG. 5. That is, the dried conductive ink 14 has a granular or crystalline-type structure which cracks or breaks upon deflection. As the conductive ink bends, the number of cracks and the space between them is believed to increase, thereby changing the electrical resistance in a predictable manner. The change can be measured upon application of suitable electrical signals.

The segmented conductor 16 is positioned along the conductive ink 14 in preselected lengths 28 to control or regulate the resistivity of the deflected conductive ink 14 and in turn ensure that upon repetitive deflections, the variation of the resistance between configurations A, B and C is consistent throughout the life of the substrate. More particularly, the length and width of the segments 16 as well as the spaces 22, 24 between the segments is empirically selected to ensure that the resistance is consistently repetitive. For example, if the width is the same as the width of the conductor means 14, a length 28 of about 3 to about 5 millimeters with spacing 22, 24 from about 1 to about 2 millimeters has been found suitable for a flexible potentiometer similar to that of FIG. 3 with a length 44 of about 10 centimeters and a width of about two centimeters.

The segmented conductor 16 has been successfully formed of silver. It is also believed formable from conductive silver alloys, and other conductive metals, as well as carbon-based compounds. The segmented conductor 16 retains its electrical conductivity upon deflection.

With the segmented conductor 16 affixed or adhered to the conductor means 14, the resistance may still vary somewhat over time, but the degree of variance is either within acceptable tolerances or otherwise measurable from time to time so that adjustments can be made to accommodate for the drift in resistance over time.

Referring to FIG. 3, it can be seen that the flexible potentiometer here illustrated has a first leg 38 and a second leg 40 both of which are substantially parallel to an axis 42 of the substrate 10 which has an overall length 44 as well as a width 46. The first leg 38 and the second leg 40 extend lengthwise and are interconnected by a third leg 48 to form the desired configuration of the conductor means 14. Notably, only one leg 38 has a conductor means 14 with a segmented conductor 16 as shown in FIGS. 1, 2 and 4. The other leg 40 has a conductor which does not vary in resistance upon deflection. In the embodiment illustrated, the leg 40 has conductor means 14 with the segmented conductor thereon, without segments so that it is continuous and unbroken.

It may be noted that the connectors 34 and 36 are slide connectors which are riveted onto the substrate 10 or otherwise affixed thereto to electrically interconnect the first leg 38 and the second leg 40 with exterior electrical components such as a microprocessor hereinbefore discussed but not here illustrated.

In use, the substrate 10 is deflected repetitively and the deflection thereof may be measured by measuring the variance in resistance at the connectors 34 and 36. Thus, the resistance and in turn the movement or deflection of a variety of objects can be measured accurately. For example, the substrate 10 can be configured to be attached to a finger of a human being. By bending the finger, the resistance of the conductive ink and in turn the entire flexible potentiometer varies as measured at the output of the flexible potentiometer and more particularly the connectors 34 and 36 so that the movement of the finger can be calculated as hereinbefore discussed.

It should be appreciated that reference herein to the details of the illustrated embodiment is not intended to limit the scope of the claims, which themselves recite those features regarded as essential to the invention.

What is claimed:

1. A flexible potentiometer comprising:
   a substrate formed of a deflectable electrical insulating material, said substrate having a length, an upper surface and a lower surface which is spaced from and in general alignment with said upper surface;
   conductor means to conduct electricity as part of an electrical circuit and adhered to one of said upper surface and said lower surface of said substrate in a preselected pattern extending along the said length of said substrate, said conductor means being formed of an electrically conductive ink which changes electrical resistance upon movement of said conductor means and said upper surface and said lower surface all together generally transversely to the length of said substrate between a first configuration and a second configuration; and
   connector means associated with said conductor means for interconnection to external electrical components.

2. A flexible potentiometer comprising:
   a substrate formed of a deflectable electrical insulating material having an upper surface and a lower surface spaced from and in general alignment with said upper surface;
   conductor means adhered to one of said upper surface and said lower surface of said substrate in a preselected pattern, said conductor means being formed of an electrically conductive ink which changes electrical resistance upon deflection of said conductor means and said upper surface and said lower surface all together between a first configuration and a second configuration;
   connector means associated with said conductor means for interconnection to external electrical components; and
   segmented conductor adhered to said conductor means, said segmented conductor being formed of an electrically conductive material in segments each spaced from the other.

3. The flexible potentiometer of claim 1 wherein the substrate is elastically deflectable.

4. The flexible potentiometer of claim 1 wherein said electrically conductive ink is of the type which is applied to said substrate in liquid form.

5. A flexible potentiometer comprising:
   a substrate formed of a deflectable electrical insulating material having an upper surface and a lower surface spaced from and in general alignment with said upper surface;
   conductor means adhered to one of said upper surface and said lower surface of said substrate in a preselected pattern, said conductor means being formed of an electrically conductive ink which changes electrical resistance upon deflection of said conductor means and said upper surface and said lower surface between a first configuration and a second configuration;
   a segmented conductor adhered to said conductor means, said segmented conductor being formed of an electrically conductive material in segments each spaced from the other, said segmented conductor being of the type that is applied to said conductor means in liquid form and dries to a solid form.

6. The flexible potentiometer of claim 2 wherein said segmented conductor is a solid material to be pressed onto said conductor means.

7. The flexible potentiometer of claim 2 wherein said substrate has a length with a longitudinal axis and is deflectable between said first configuration and said second configuration along said longitudinal axis.

8. The flexible potentiometer of claim 7 wherein said preselected pattern of said conductor means is a circuit having a first leg extending along said length, a second leg extending along said length and a third leg interconnecting said first leg with said second leg.

9. The flexible potentiometer of claim 8 wherein said first leg and said second leg are substantially parallel to said longitudinal axis.

10. The flexible potentiometer of claim 8 wherein said conductor means has a width, wherein said segmented conductor has a plurality of segments each having a width substantially the width of said conductor means and a length selected to regulate the electrical resistance of said conductor means.

11. The flexible potentiometer of claim 10 wherein said segmented conductor is made of a soft conductive metal.

12. The flexible potentiometer of claim 11 wherein the segmented conductor is made of silver or a silver alloy.

13. The flexible potentiometer of claim 10 wherein the segmented conductor is made of carbon or a carbon compound.

14. The flexible potentiometer of claim 10 wherein each segment is from about two millimeters to about ten millimeters in length.

15. For measuring or detecting deflection, a flexible potentiometer comprising:

a substrate having a length and a width, said substrate being formed of an elastically deflectable and electrically insulating material;

an electrically conductive ink adhered to said substrate in a pattern having a first leg and a second leg each extending lengthwise of said substrate and elastically deformable to predictably change electrical resistance upon deflection of said substrate from a first configuration to a second configuration;

a segmented conductor adhered to said electrically conductive ink, said segmented conductor being formed of an electrically conductive material deposited on said electrically conductive ink in spaced apart segments; and connector means associated with said electrically conductive ink for interconnection to external electrical components.

16. A flexible potentiometer comprising:

a substrate formed of an electrical insulating material, said substrate having an upper surface and a lower surface, spaced from and in general alignment with said upper surface, said substrate having a longitudinal axis and said substrate being bendable generally transversely to said longitudinal axis between a first configuration and a second configuration in which said upper surface and said lower surface are together bent transverse to said longitudinal axis;

conductor means adhered to one of said upper surface and said lower surface of said substrate in a preselected pattern to be bendable upon bending of said substrate, said conductor means being formed of an electrically conductive ink which changes electrical resistance upon said bending of said conductor means and said substrate between said first configuration and said second configuration; and connector means associated with said conductor means for interconnection to external electrical components.

17. A method for varying the resistance in an electrical circuit comprising:

providing a substrate formed of a deflectable electrical insulating material, said substrate having a length, an upper surface and a lower surface which is spaced from and in general alignment with said upper surface;

providing conductor means for conducting electricity as part of an electrical circuit and adhering said conductor means to one of said upper surface and said lower surface of said substrate in a preselected pattern extending along the said length of said substrate, said conductor means being formed of an electrically conductive ink which changes electrical resistance upon movement of said conductor means and said upper surface and said lower surface all together generally transversely to said length between a first configuration and a second configuration;

providing connector means for connection to external electrical components;

connecting said connector means to said conductor means and to external electrical components in said electrical circuit; and bending said substrate and said conductor means between a first position and a second position.

* * * * *